(12) United States Patent
Young et al.

(10) Patent No.: US 8,500,847 B2
(45) Date of Patent: Aug. 6, 2013

(54) METHOD FOR AQUEOUS GOLD THIOSULFATE EXTRACTION USING COPPER-CYANIDE PRETREATED CARBON ADSORPTION

(76) Inventors: Courtney Young, Butte, MT (US); Mariam Melashvili, Vancouver (CA); Nicholas V. Gow, Butte, MT (US)

( * ) Notice: Subject to any disclaimer, the term of this patent is extended or adjusted under 35 U.S.C. 154(b) by 39 days.

(21) Appl. No.: 13/094,139

(22) Filed: Apr. 26, 2011

(65) Prior Publication Data

US 2011/0259148 A1 Oct. 27, 2011

Related U.S. Application Data

(60) Provisional application No. 61/328,354, filed on Apr. 27, 2010.

(51) Int. Cl.
*C22B 3/04* (2006.01)
*C22B 3/24* (2006.01)

(52) U.S. Cl.
USPC ............... 75/744; 423/29; 210/665

(58) Field of Classification Search
USPC ............................ 75/744; 423/29
See application file for complete search history.

(56) References Cited

U.S. PATENT DOCUMENTS 4,537,628 A * 8/1985 Lakshmanan et al. .......... 75/428
6,551,514 B1 * 4/2003 Misra et al. ................... 210/665

OTHER PUBLICATIONS

Young, C.A. et al, Cuprous Cyanide Adsorption on Activated Carbon, Hydrometallurgy 2008—International Conference honoring Robert S. Shoemaker, 2008, pp. 269-276.*
Jay, W.H., Copper Cyanidation Chemistry and the Application of Ion Exchange Resins and Solvent Extractants in Copper-Gold Cyanide Recovery Systems, Proceedings of Alta 2000 Conference, 2000, pp. 1-30, Adelaide, Australia.
Young, C.A., et al., Cuprous Cyanide Adsorption on Activated Carbon, Hydrometallurgy 2008—International Conference honoring Robert S. Shoemaker, 2008, pp. 269-276.

* cited by examiner

*Primary Examiner* — George Wyszomierski
*Assistant Examiner* — Tima M McGuthry Banks
(74) *Attorney, Agent, or Firm* — Jean Kyle

(57) ABSTRACT

A gold thiosulfate leaching process uses carbon to remove gold from the leach liquor. The activated carbon is pretreated with copper cyanide. A copper (on the carbon) to gold (in solution) ratio of at least 1.5 optimizes gold recovery from solution. To recover the gold from the carbon, conventional elution technology works but is dependent on the copper to gold ratio on the carbon.

5 Claims, 4 Drawing Sheets

| Test # | moles Cu (carbon) | moles Au (solution) | Cu/Au | Log Cu/Au | Recovery of Au, % | Log Au, % | Exchanged copper |
|---|---|---|---|---|---|---|---|
| 6 | 4.00E-04 | 5.00E-04 | 0.6 | -0.2 | 75.95 | 1.88 | 1.20E-06 |
| 3 | 2.80E-04 | 2.70E-04 | 1 | 0 | 90.12 | 1.95 | 1.20E-07 |
| 4 | 2.70E-04 | 1.60E-04 | 1.7 | 0.2 | 99.99 | 2 | 1.10E-07 |
| 5 | 1.20E-03 | 5.00E-04 | 2.5 | 0.4 | 99.98 | 2 | 8.90E-07 |
| 1 | 2.10E-03 | 2.70E-04 | 7.7 | 0.9 | 99.98 | 2 | 3.50E-05 |
| 2 | 1.50E-03 | 1.40E-04 | 10.9 | 1 | 99.92 | 2 | 1.00E-05 |

FIG. 3

| Carbon Weight (g) | NaCN (%) | NaOH (%) | Time (min) | Bed Volume | Cu/Au ratio on Carbon | Au Recovery (%) |
|---|---|---|---|---|---|---|
| 7.85 | 1 | 1 | 30 | 24.3 | 3.1 | 6 |
| 8.32 | .5 | 1 | 60 | 24.67 | 1.8 | 57 |
| 7.92 | 1 | 1 | 30 | 27.22 | .5 | 83 |
| 8.38 | 1 | 1 | 30 | 27.0 | .2 | 97 |

FIG. 4

METHOD FOR AQUEOUS GOLD THIOSULFATE EXTRACTION USING COPPER-CYANIDE PRETREATED CARBON ADSORPTION

CROSS-REFERENCE TO RELATED APPLICATIONS

This application claims the benefits of U.S. Provisional Application No. 61/328,354 filed Apr. 27, 2010, the disclosure of which is hereby incorporated by reference in its entirety including all figures, tables and drawings.

STATEMENT REGARDING FEDERALLY SPONSORED RESEARCH OR DEVELOPMENT

This invention was made with Government support under Grant Nos. DE-FC26-02NT41607 and DE-FC26-05NT42457 awarded by the Department of Energy. The government has certain rights in the invention.

REFERENCE TO SEQUENCE LISTING, A TABLE, OR A COMPUTER PROGRAM LISTING COMPACT DISC APPENDIX

Not applicable.

BACKGROUND OF THE INVENTION

Gold is generally recovered from ore by a cyanide leaching process. This procedure is used because of its simplicity and ability to work effectively at low ore concentrations. Cyanide however is toxic. Furthermore, it leaches relatively non-specifically causing other metals to dissolve into the leach solution providing a variety of metal cyanide complexes. These metal cyanide complexes can also be toxic. Leach solutions have been accidentally released from various process facilities causing environmental damage. Consequently, and especially over the last decade, alternatives to cyanide leaching have been sought.

Particular attention has been given to thiosulfate; but, recovery of gold from the thiosulfate leach solutions presents a problem. Activated carbon cannot be used to recover the gold like it is used with cyanide leach liquors because it has a very low affinity for gold thiosulfate. Further, in cyanide leach liquors, when copper is present in the ore, it competes for cyanide ions with gold and causes high cyanide-consumption rates. Because the copper in the ore is usually present in larger amounts than the gold, resulting copper-cyanide ions are also present at higher concentrations and thereby compete with gold-cyanide ions for the adsorption sites on the activated carbon (Jay, 2000). Thiosulfate, similarity, leaches both copper and gold. Yet, copper is needed to stabilize the thiosulfate as well as catalyze the leaching reaction.

Since carbon adsorption is so problematic, extensive research efforts have turned to developing resin adsorption for gold recovery. However, resins suffer from fouling and are inherently expensive. An anti-fouling and cheaper alternative is therefore needed to make thiosulfate technology competitive with cyanidation.

All patents, patent applications, provisional patent applications and publications referred to or cited herein, are incorporated by reference in their entirety to the extent they are not inconsistent with the teachings of the specification.

BRIEF SUMMARY OF THE INVENTION

A gold thiosulfate solution recovery process is described that has, at most, only two new stages over the conventional gold cyanide recovery process. Activated carbon is pretreated with copper cyanide which is then used to recover gold from thiosulfate solution. Contacting the resulting pregnant carbon in a strong cyanide solution separates gold and copper from the carbon facilitating both copper and gold elution. Resulting copper and gold cyanide complexes can be recovered but their elution and separation efficiencies depend on the copper:gold ratio on the carbon surface. If the copper is initially present at low adsorption density, the copper and gold will exchange in a 1:1 ratio and all the copper can be displaced. If the copper is initially present in high amounts, not all of the copper will be displaced. The cost of operation of the subject system is similar to traditional cyanidation yet avoids the problems and the stigma associated with cyanide.

BRIEF DESCRIPTION OF THE SEVERAL VIEWS OF THE DRAWING

FIG. 3 is a table showing the relationship of gold recovery from solution (i.e., adsorption) to the Cu:Au ratio with Cu on the Carbon and Au in solution.

FIG. 4 is a table showing gold recovery from the carbon (i.e., elution) to Cu:Au ratio with Cu and Au both on the carbon.

DETAILED DESCRIPTION OF THE INVENTION

The invention involves a method of a thiosulfate leaching wherein gold recovery is facilitated through carbon absorption. Activated carbon is pretreated with copper cyanide so it effectively removes gold from the leach solution. Copper cyanide adsorption on the activated carbon is obtained at moderate alkaline conditions between pH 9 and pH 11. For safety reasons such that hydrogen cyanide gas production is avoided, lower pH values should be avoided and pretreatment of the activated carbon should be above at least pH 10.5 (see Young, 2008).

The gold thiosulfate solution recovery system of the subject invention is advantageous in that, at most, only two steps are added to a conventional leaching procedure. Therefore, the cost of the subject system is not significantly increased over present cyanidation recovery systems making the subject system a viable alternative to cyanide leaching.

Figure 1:
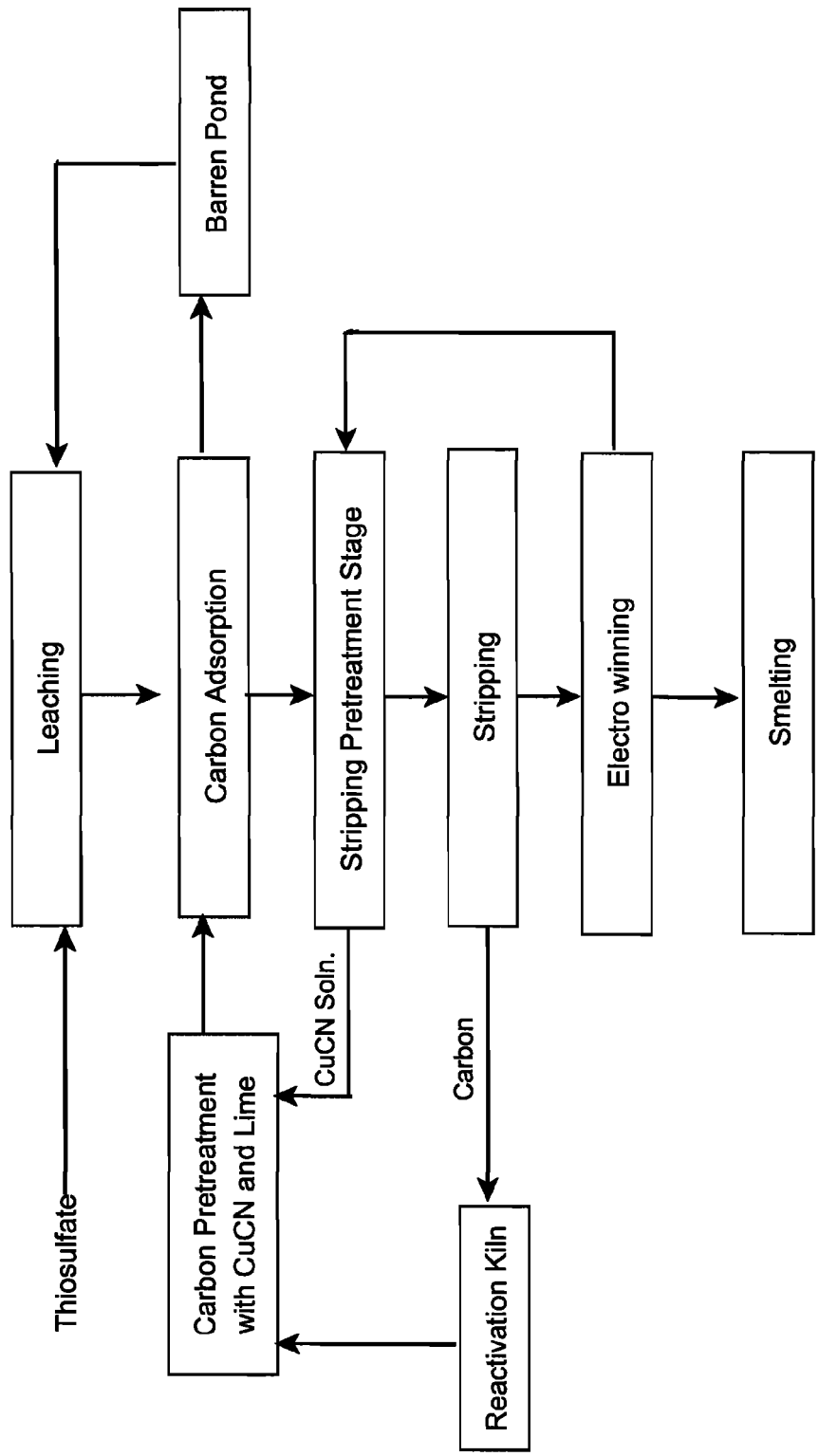
FIG. 1 is a flowsheet of a preferred embodiment of the gold thiosulfate solution recovery system of the subject invention and is typically needed at high copper pretreatment.
Figure 2:
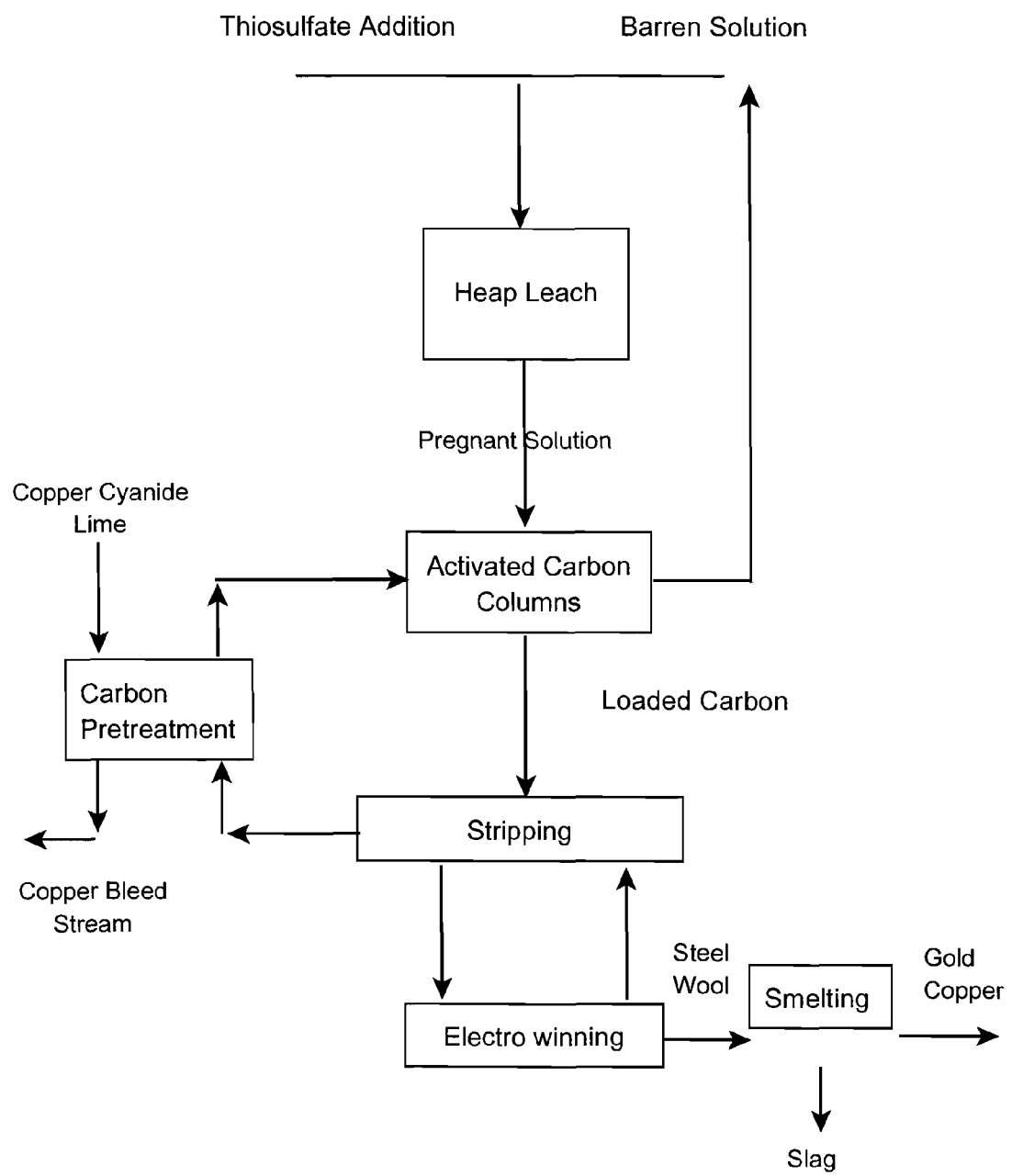
FIG. 2 is a flowsheet of the gold thiosulfate solution recovery system of the subject invention of the subject invention and is typically needed at low copper pretreatment.

A flowsheet of a preferred embodiment of the system of the subject invention is shown in FIG. 1. This flowsheet typically occurs at high copper pretreatment and is needed when the copper is not completely displaced from the pretreated carbon during the gold recovery step thereby allowing the copper to be recovered following elution. A flowsheet of the system is also shown in FIG. 2 which typically occurs at low copper pretreatment. Either system is configured and uses the equipment of a traditional cyanide leaching system. In a typical cyanide leach system, ore is treated with the leach agent, activated carbon adsorbs desired metals from the leach solution and, free leach agent is sent back to the leaching process through a barren pond. Bound metals are stripped from the carbon. Carbon is reactivated in a kiln for further use. The stripped metals are isolated from solution by electrowinning and smelting.

In the process of the subject invention, the leach agent is thiosulfate. Leaching is conducted by thiosulfate leach procedures well known in the art. Gold is removed from the thiosulfate leach solution by activated carbon pretreated with copper cyanide. The gold can be recovered by conventional stripping/elution with strong cyanide/caustic solution and produced by conventional electrowinning and smelting as incurred with current cyanidation technologies.

Gold removal from the thiosulfate solution is further optimized when the ratio of copper on carbon to gold in solution exceeds approximately [Cu(mg/g)/Au(mg/L)]>1.5. Results shown as a table in FIG. 3 clearly indicate that gold removal is nearly 100% at ratios of 10.9, 7.7, 2.5 and 1.7 but decreases to 90% and 76% at ratios of 1.0 and 0.8, respectively.

Gold stripping/elution from the activated carbon, by comparison, is dependent on the copper and gold ratio on the carbon because the strong cyanide/caustic solution that is needed strips both but is preferential to copper. Results shown as a table in FIG. 4 clearly indicate that gold elution at a 3.1:1 ratio is only 6% and increases to 97% at a ratio of 0.2:1.

It is understood that the best elution results are obtained by keeping the Cu:Au ratio on the carbon as low as possible meaning that the Cu on carbon to Au in solution ratio should be as close to 1.5 as possible.

It is further understood that the foregoing examples are merely illustrative of the present invention. Certain modifications of the articles and/or methods may be made and still achieve the objectives of the invention. Such modifications are contemplated as within the scope of the claimed invention.

REFERENCES

Jay, W. H. (2000), Copper cyanidation chemistry and the Application of Ion Exchange Resins and Solvent Extractants in Copper-Gold cyanide Recovery Systems, In: Proceedings of Alta 2000 Conference, Adelaide, Australia.

Young, C. A., C. G. Anderson, P. R. Taylor, and Y. Choi (2008), Cuprous Cyanide Adsorption on Activated Carbon, Hydrometallurgy 2008-International Conference honoring Robert S. Shoemaker.

The invention claimed is:

1. A method of recovering gold from ore containing gold, the method comprising the steps of:
    treating the ore with a thiosulfate leach agent to obtain a leach solution containing gold;
    pretreating activated carbon with copper cyanide to present copper cyanide on a surface of the activated carbon;
    loading the pretreated activated carbon with the leach solution containing gold to adsorb gold onto the pretreated activated carbon, wherein a ratio of copper cyanide on the surface of the pretreated activated carbon to gold in the leach solution is at least about 1.5;
    stripping the adsorbed gold from the pretreated activated carbon with a cyanide solution, wherein a ratio of copper and gold on the surface of the pretreated activated carbon is less than about 1.5; and
    isolating the gold.

2. The method of claim 1, wherein said activated carbon is pretreated with copper cyanide at a pH from about 9 to about 11.

3. The method of claim 2, wherein said activated carbon is pretreated with copper cyanide at a pH of at least 10.5.

4. The method of claim 1, wherein said pretreated activated carbon with the adsorbed gold is contacted with a cyanide solution.

5. The method of claim 1, wherein said gold is isolated by electrowinning and smelting.

* * * * *